United States Patent [19]
Klement et al.

[11] 3,941,907
[45] Mar. 2, 1976

[54] PARTING AGENT FOR ELASTOMER COMPOSITIONS

[75] Inventors: Günter Klement, Dusseldorf-Holthausen; Horst Baumann, Leichlingen; Eugen Scheidt, Dusseldorf-Holthausen, all of Germany

[73] Assignee: Henkel & Cie G.m.b.H., Dusseldorf-Holthausen, Germany

[22] Filed: Nov. 28, 1973

[21] Appl. No.: 419,600

[30] Foreign Application Priority Data
Dec. 22, 1972   Germany.......................... 2262916
July 5, 1973    Germany.......................... 2334205

[52] U.S. Cl. ............... 428/341; 428/441; 428/492; 106/38.22; 264/338
[51] Int. Cl.² .......................................... B28B 7/36
[58] Field of Search................ 106/38.22; 264/338; 117/5.3

[56]       References Cited
        UNITED STATES PATENTS
3,188,226   6/1965   Jense ................................... 117/5.3
3,503,773   3/1970   Heinrich ........................... 264/338

OTHER PUBLICATIONS
Chem. Abst. 48:11,104g, 1951.

*Primary Examiner*—Theodore Morris
*Attorney, Agent, or Firm*—Hammond & Littell

[57] ABSTRACT

This invention relates to the use of salts of diamines having the formula

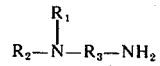

where $R_3$ is alkylene having 2 to 4 carbon atoms and $R_1$ and $R_2$, together or separately, are hydrogen or alkyl having 1 to 8 carbon atoms, with an anion component having the formula

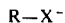

where $X^-$ is $-SO_3^-$ or $-OCO_3^-$ and R is a hydrocarbon radical having 6 to 26 carbon atoms which may be interrupted or substituted by groups containing heteroatoms, as parting agents for natural and synthetic elastomer compositions.

3 Claims, No Drawings

PARTING AGENT FOR ELASTOMER COMPOSITIONS

THE PRIOR ART

When manufacturing rubber goods from natural and synthetic rubber, parting agents are required which, on the one hand, prevent the unvulcanized sheets or unfinished material from sticking together after the unvulcanized rubber mixture has been produced until it is further processed and, on the other hand, prevent the unvulcanized rubber mixture from adhering in the vulcanizing mold and thus facilitate the releasing of the vulcanizate from the molds.

A large number of different products are already known as parting agents for elastomers and can be divided into two broad classes, i.e. pulverulent and liquid parting agents. The best known of the pulverulent parting agents are, for example, talc or zinc stearate. The chief disadvantages of these powdery parting agents are the development of dust in factories and the partially poor weldability during vulcanizing of the unfinished material, treated with talc or powdered corn starch. Attempts have been made to overcome the disadvantageous developing of dust by suspending the powdered agent in an aqueous phase through which the unvulcanized sheets of rubber mixture are then drawn.

However, the dispersions of the said pulverulent agents also have disadvantages. The tendency of the solid materials to form sediments is troublesome, resulting in deposits formed in the pipes and the blocking of the nozzles in the modern unvulcanized sheet cooling plant in which the parting agent is sprayed onto the unvulcanized sheets of rubber mixture. Furthermore, inhomogeneous dispersions lead to greatly varying deposits on the surfaces of the mixture.

A further possibility of overcoming the said disadvantages resides in replacing pulverulent agents by liquid parting agents, the most important of which are still those based on fatty acids, owing to the economy and the possibility of using them in aqueous solution. Such products generally contain sodium or potassium soaps. Alkali metal salts of the sulfuric acid partial esters of fatty alcohols and naphthalene sulfonic acids have also been proposed (see, for example, Boström, Kautschuk-Handbuch, Verlag Berliner Union, Stuttgart, Volume 2, page 314). Water-soluble polymers such as cellulose ethers, carboxymethyl cellulose or polyglycol ethers are added to improve the parting effect. However, even these products do not always meet practical requirements. By way of example, the above-mentioned soaps produce a strongly alkaline solution which is physiologically harmful. The sulfates and sulfonates do not have an adequate wetting effect and parting effect for all mixture surfaces. Thus, in practice, one is frequently forced to use liquid parting agents combined with the dispersed pulverulent agents.

Silicone oils and fluorinated hydrocarbons are especially used as parting agents in the many cases in which parting agents based on fatty acids do not develop an adequate parting effect when used as, for example, coating agents for molds. However, in addition to their higher cost, these products have the disadvantage that portions of the parting agent transferred to the vulcanizate have a detrimental effect upon the adhesion of a subsequently applied finish or coat of varnish, and also hinder the coalescing of the vulcanizate to form a composite article.

Furthermore, the salts of olefin sulfonic acids as well as α-sulfocarboxylic acids have a chain length of from 8 to 26 carbon atoms have been proposed as parting agents for elastomers. The cation components of these salts were the alkali metals sodium, potassium, lithium, also calcium, magnesium, ammonium, short-chain aliphatic amines having from 1 to 4 carbon atoms such as methylamine, ethylamine, propylamine, isopropylamine and butylamine, as well as short-chain aliphatic alkanolamines such as monoethanolamine, diethanolamine and triethanolamine. Even though these products have generally proved to be very serviceable parting agents for elastomers, they nevertheless also involve parting problems in the case of special elastomer mixtures.

OBJECTS OF THE INVENTION

An object of the present invention is the development of parting agents which have a very satisfactory parting effect without the disadvantages of powdered agents and parting agents based on fatty acids and silicone oil and which may also be used universally to equally good effect.

Another object of the present invention is the development of an improvement in the process of separating sheets of unvulcanized rubber compositions and facilitating the removal of molded vulcanized rubber compositions from a mold comprising applying a thin film of a parting agent to the surfaces of sheets of unvulcanized rubber compositions or the surface of a mold or both and separating said sheets of unvulcanized rubber compositions without self-adhering or separating molded vulcanized rubber compositions from said mold, the improvement consisting of utilizing, as said parting agent, a salt of a diamine having the formula

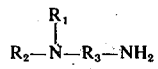

wherein $R_3$ is alkylene having 2 to 4 carbon atoms and $R_1$ and $R_2$ are members selected from the group consisting of hydrogen, alkyl having 1 to 8 carbon atoms and one hydrogen and one alkyl having 1 to 8 carbon atoms, with an anion component having the formula

where $X^-$ is an anion selected from the group consisting of $-SO_3^-$ and $-OSO_3^-$ and R is a monovalent hydrocarbon having 6 to 26 carbon atoms optionally substituted or interrupted by groups containing the heteroatoms selected from the group consisting of oxygen, sulfur and nitrogen.

A further object of the present invention is the development of an aqueous composition for use as a parting agent consisting of from 0.1% to 10% by weight of a salt of a diamine having the formula

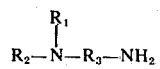

wherein $R_3$ is alkylene having 2 to 4 carbon atoms and $R_1$ and $R_2$ are members selected from the group consisting of hydrogen, alkyl having 1 to 8 carbon atoms and one hydrogen and one alkyl having 1 to 8 carbon atoms, with an anion component having the formula

R — X⁻ where X⁻ is an anion selected from the group consisting of —SO₃⁻ and —OSO₃⁻ and R is a monovalent hydrocarbon having 6 to 26 carbon atoms optionally substituted or interrupted by groups containing the heteroatoms selected from the group consisting of oxygen, sulfur and nitrogen, in water.

These and other objects of the present invention will become more apparent as the description thereof proceeds.

DESCRIPTION OF THE INVENTION

The drawbacks of the prior art were overcome by using salts of

A. primary-alkylene diamines, primary-secondary alkylene diamines or primary-tertiary alkylene diamines having a chain length in the alkylene of from 2 to 4 carbon atoms, in which the secondary or tertiary amino group is substituted by alkyl radicals having from 1 to 8 carbon atoms, as a cation component, and B. an anion component of the general formula

R — X⁻ in which X⁻ represents the group —SO₃⁻ or —OSO₃⁻ and R represents an organic radical having from 6 to 26 carbon atoms and which may be substituted or interrupted by groups containing heteroatoms, as a parting agent for natural and synthetic elastomers.

More particularly, the invention resides in an improvement in the process of separating sheets of unvulcanized rubber compositions and facilitating the removal of molded vulcanized rubber compositions from a mold comprising applying a thin film of a parting agent to the surfaces of sheets of unvulcanized rubber compositions or the surface of a mold or both and separating said sheets of unvulcanized rubber compositions without self-adhering or separating molded vulcanized rubber compositions from said mold, the improvement consisting of utilizing, as said parting agent, a salt of a diamine having the formula

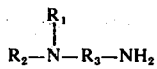

wherein R₃ is alkylene having 2 to 4 carbon atoms and R₁ and R₂ are members selected from the group consisting of hydrogen, alkyl having 1 to 8 carbon atoms and one hydrogen and one alkyl having 1 to 8 carbon atoms, with an anion component having the formula

R — X⁻ where X⁻ is an anion selected from the group consisting of —SO₃⁻ and —OSO₃⁻ and R is a monovalent hydrocarbon having 6 to 26 carbon atoms optionally substituted or interrupted by groups containing the heteroatoms selected from the group consisting of oxygen, sulfur and nitrogen, as well as the aqueous compositions containing from 0.1% to 10% by weight of the above amine salt.

The diamine salts to be used in accordance with the invention can be manufactured in a simple and ready manner by reacting equivalent quantities of the corresponding diamines with the corresponding sulfonic acids or sulfuric acid partial esters in aqueous solution.

In the case of the primary alkylene diamines having a chain length in the alkylene of from 2 to 4 carbon atoms, suitable cation components of the salts to be used in accordance with the invention are, for example, ethylene diamine, propylene diamine-1,2, propylene diamine 1,3, and butylene diamine-1,4. Salts of diamines having a chain length of 3 carbon atoms, such as propylene diamine-1,2, and propylene diamine-1,3, are of particular importance.

Suitable cation components of the salts to be used in accordance with the invention are also primary-secondary alkylene diamines or primary-tertiary alkylene diamines having a chain length in the alkylene of from 2 to 4 carbon atoms and an alkyl having 1 to 8 carbon atoms, such as: 1-methylamino-2-amino-ethane, 1-ethylamino-2amino-ethane, 1-n-propylamino-2-amino-ethane, 1-n-butylamino-2-amino-ethane, 1-n-hexylamino-2-amino-ethane 1-n-octylamino-2-amino-ethane, 1,1-dimethylamino-2-amino-ethane, 1,1-diethylamino-2-amino-ethane, 1,1-dioctylamino-2-amino-ethane, 1-methylamino-2-amino-propane, 1-n-butylamino-2-amino-propane, 1,1-dimethylamino-2-amino-propane, 1,1-dipropylamino-2-amino-propane, 1-amino-2-methylamino-propane, 1-amino-2,2-dimethylamino-propane, 1-amino-2-n-hexylamino-propane, 1-methylamino-3-amino-propane, 1-ethylamino-3-amino-propane, 1-n-butylamino-3-amino-propane, 1-octylamino-3-amino-propane, 1,1-dimethylamino-3-amino-propane, 1,1-diethylamino-3-amino-propane, 1,1-di-n-propylamino-3-amino-propane, 1,1-di-n-hexylamino-3-amino-propane, 1,1-dioctylamino-3-amino-propane, 1-methylamino-4-amino-butane, 1-ethylamino-4-amino-butane, 1-isopropylamino-4-amino-butane, 1-octylamino-4-amino-butane, 1,1-dimethylamino-4-amino-butane, 1,1-dibutylamino-4-amino-butane, 1,1-dioctylamino-4-amino-butane. Salts of 1,3-diaminopropane, in which substitution by one or two methyl radicals has been effected in an amino group, are of particular importance.

The salts of the di-primary amines have the greater importance and are therefore preferable.

The anion component of the salts to be used in accordance with the invention comprises sulfonic acids or sulfuric acid partial esters whose organic radical contains 6 to 26 carbon atoms. This organic radical can be of an aliphatic, cycloaliphatic, aromatic, aliphatic-aromatic or aromatic-aliphatic nature and have hydroxyl-, ester- or ether groupings as further substituents in addition to the sulfonic acid or sulfuric acid partial ester group. The hydrocarbon chain of the radical can be interrupted by heteroatoms or groupings containing heteroatoms, such as oxygen, sulfur, imino group, ester group, or can have unsaturated bonds or branchings. In the event of the anion component being a sulfonic acid, the organic radical may comprise one or two aromatic nuclei which in turn may carry aliphatic side chains having from 4 to 12 carbon atoms, Examples of suitable anion components are alkyl sulfuric acid partial esters or monoalkylsulfates having from 6 to 26 carbon atoms, such as the sulfuric acid partial ester of octyl alcohol, decyl alcohol, dodecyl alcohol, palmityl alcohol, stearyl alcohol, monoalkenylsulfates having from 6 to 26 carbon atoms such as mono-oleylsulfate, monoalkadienylsulfates having from 6 to 26 carbon atoms such as monolinoleylsulfate, sulfuric acid partial esters of the products of addition of from 1 to 20 mols of ethylene oxide to one mol of saturated or unsaturated fatty alcohols having from 6 to 26 carbon atoms of the alkanol, alkenol and alkadienol series, such as the sulfuric acid partial ester of a $C_{12}$–$C_{14}$ fatty alcohol ethoxylated with 2 mols of ethylene oxide (EO), alkylbenzenesulfonic acids, whose alkyl radical can have from 4 to 12 carbon atoms, such as dodecylbenzenesulfonic acid, olefinsulfonic acids having from 6 to 26 carbon atoms, particularly the olefin sulfonic acids obtained from α-olefins, such as a mixture of sulfonated α-olefins having from 15 to 18 carbon atoms, α-sulfo-fatty acid alkyl esters whose alkyl radical has from 1 to 4 carbon atoms and whose fatty acid moiety has from 6 to 26 carbon atoms, such as α-sulfocaprylic acid-O-methylester, α-sulfocapric acid-O-propylester, α-sulfolauric acid-O-ethylester, α-sulfo hydrogenated coconut fatty acid-O-methylester, α-sulfopalmitic acid-O-methylester, α-sulfostearic acid-O-methylester, α-sulfo hydrogenated palm kernel fatty acid-O-methylester, α-sulfo hydrogenated tallow fatty acid-O-methylester, α-sulfobehenic acid-O-methylester.

The diamine salts of the olefin sulfonic acid, to be used in accordance with the invention, can be produced by generally known processes, such as complete or partial sulfonating of olefins by means of sulfur trioxide mixed with air, neutralizing the sulfonic acids obtained with the corresponding diamines, and hydrolysis. The following products may be mentioned as examples of the starting olefins which may be used for producing the olefin sulfonic acids: cracked olefins of the chain lengths $C_8$ to $C_{26}$, particularly those of commercially available qualities having chain lengths of $C_{12}$ to $C_{20}$, Ziegler olefins of the chain lengths $C_8$ to $C_{26}$, particularly products of the chain lengths $C_{10}$ to $C_{22}$. Furthermore, the non-terminal olefins may be mentioned, such as are obtained from paraffins by chlorination and subsequent dehydrochlorination or by isomerization of α-olefins and of which all the straight and branched chain products of the chain lengths $C_8$ to $C_{26}$ are suitable, particularly the commercially available products of the chain lengths $C_{12}$ to $C_{20}$.

The α-sulfo fatty acid alkyl esters can be produced by known methods, for example by complete or partial sulfonation of the corresponding fatty acid alkyl esters by means of sulfur trioxide. Further processing to form the diamine salts is then effected by using the corresponding diamine to neutralize the α-sulfo fatty acid —O-alkyl esters obtained.

The diamine salts which are to be used according to the invention are surprisingly clearly soluble in water. They also wet rubber surfaces which cannot be wetted at all or are wetted only with difficulty with other products and have an extremely good separating effect even for very highly plasticized adhesive mixtures over a relatively long period of time. A further advantage of the diamine salts to be used in accordance with the invention is that the film of parting agent can be readily removed simply by rinsing with water, which is particularly advantageous when manufacturing ready-made rubber articles such as rubber boots or rubber-coated rolls and rubber-coated container linings.

If the rubber mixtures treated with the parting agents in accordance with the invention are vulcanized in conventional vulcanizing molds under pressure and heat, the parting agents do not have to be previously rinsed, since they are largely absorbed by the rubber mixture when the latter is flowing. On the other hand, spotless vulcanizate surfaces are obtained if the preformed rubber articles are openly vulcanized in steam or hot air.

Advantageously, the diamine salts to be used in accordance with the invention as parting agents for natural or synthetic elastomers are used in aqueous solution and a concentration of 0.1 to 10 percent by weight, preferably 0.2 to 2 percent by weight. The solutions are applied to the unvulcanized rubber composition surfaces and/or to the mold surfaces by conventional methods such as spraying or dipping. The aqueous solutions are then dried to give a film of the parting agents. This film can be from 25 mg to 5.0 gm per square meter of surface for good parting effects.

In order to obtain specific effects, it is possible to add, in a known manner, water-soluble polymers for the purpose of improving the film formation and to increase the viscosity of the solutions. Suitable substances are, for example, carboxymethylcellulose, hydroxyethylcellulose, and methylcellulose. The products are normally used individually in technical purity, although the compounds may be used mixed with one another or mixed with emulsions of silicone oils and fluorohydrocarbons.

Although the parting agents in accordance with the invention are used chiefly in the treatment of unvulcanized sheets of rubber mixtures or unfinished rubber mixtures, it is equally possible to use the parting agents as mold parting agents.

In order to obtain a satisfactory parting effect between unvulcanized sheets of rubber, they are preferably painted or sprayed with the solution of the parting agents or are immersed in the solution and then dried to give films of from 25 mg to 5.0 gm/m². When used as coating agents for molds, the molds, made from steel, aluminum or chromium-plated steel, are coated or sprayed with the aqueous solutions, and the water is evaporated to give films of from 25 mg to 5.0 gm/m². Furthermore, anticorrosion agents, complex formers for sequestering the hardness of the water and, for example, specific silicone compounds acting as foam inhibitors, can be added to the solutions in smaller quantities.

Even if it is to be conventionally preferred to use water as a solvent for the diamine salts to be used in accordance with the invention, it is, on the other hand, also possible to additionally use organic solvents such as methylene chloride or lower alcohols or ketones, such as alkanols having 1 to 4 carbon atoms or alkanones having 3 to 4 carbon atoms, individually or mixed for specific forms of use, for example in spray nozzles.

The following examples are intended to further explain the subject of the present invention without limiting the invention to the said examples.

EXAMPLES

Testing the layer parting effect

The parting effect of the diamine salts to be used in accordance with the invention and of comparison products was tested on an adhesive mixture of natural rubber and regenerated natural rubber which blends (welds) when stored without the use of the parting agents and, on the other hand, on a nitrile rubber mixture which is difficult to wet.

For this purpose, mixtures of the following composition, free from sulfur and accelerators, were produced on a two-roller mill:

| Mixture NR/Reg. | Parts by Weight |
| --- | --- |
| Natural rubber (RSS 1) | 50 |
| Natural rubber regenerate | 100 |
| Activated zinc oxide | 5 |
| Factice F 10 (of the firm Dr. Grandel, Hamburg) | 5 |
| Stearic acid | 1 |
| Phenyl-β-naphthylamine | 1 |
| Microcrystalline wax | 1 |
| Chalk | 20 |
| Carbon black (N 326) | 20 |
| Naphthenic oil | 25 |

| Mixture NBR | Parts by Weight |
| --- | --- |
| Nitrile rubber (28% acrylonitrile) | 100 |
| Activated zinc oxide | 5 |
| 2-Mercaptobenzimidazole | 1.5 |
| Phenyl-β-naphthylamine | 1.5 |
| N-phenyl-N'-isopropyl-p-phenylenediamine | 3.5 |
| Carbon black (N 550) | 40.0 |
| Stearic acid | 0.5 |
| Microcrystalline wax | 3.0 |
| Etherthioether("Plastikator OT" of the firm Farbenfabriken Bayer AG) | 20.0 |

Strips of 5 cm in width and 30 cm in length were cut from respective, freshly manufactured, 4 mm thick sheets of the mixtures. The strips were immersed at room temperature in a 2% aqueous solution of the compounds specified hereinafter. The wetting was observed during drying with reference to the film formation and was assessed as follows:

1 = satisfactory wetting, closed film
2 = moderate wetting, film split at some places
3 = poor wetting, no formation of film After drying for one hour at room temperature, the strips were folded over and then in the manner of a Z to from a packet, whose surface was now 5 × 5 cm, and were stored for 24 hours at room temperature under a load of 1 kg. The packet was subsequently unfolded and the parting action was assessed as follows:

1 = easy, complete parting
2 = difficult, complete parting
3 = more than 50% parting, remainder of rubber was cracked
4 = more than 50% cracks in rubber

EXAMPLE 1

1 equivalent of α-sulfo hydrogenated palm kernel fatty acid methyl ester was reacted in aqueous solution with 1.2 equivalents of ethylenediamine, 1.1 equivalents of propylenediamine-1,2, 1.1 equivalents of propylenediamine-1,3, 1.1 equivalents of butylenediamine-1,4, 1.1 equivalents of 1-methylamino-3-amino-propane and 1.1 equivalents of 1-dimethylamino-3-amino-propane, respectively and, for comparison, with 1.1 equivalents of hexamethylenediamine-1,6. The clear aqueous solutions produced were diluted to 2% for the purpose of testing the layer separation and were used in conformity with the above description. For the purpose of comparison, 2% aqueous solutions of the salts of α-sulfo hydrogenated palm kernel fatty acid methyl ester were used with equivalents of ammonia, diethylenetriamine, n-butylamine and magnesium. The following results were obtained:

TABLE I

| Salt | Wetting | | Layer Separation | |
| --- | --- | --- | --- | --- |
| | NR/Reg | NBR | NR/Reg | NBR |
| Ethylenediamine | 2 | 2 | 2 | 2 |
| Propylenediamine-1,2 | 1 | 1 | 1 | 1 |

TABLE I-continued

| Salt | Wetting | | Layer Separation | |
| --- | --- | --- | --- | --- |
| | NR/Reg | NBR | NR/Reg | NBR |
| Propylenediamine-1,3 | 1 | 1 | 1 | 1 |
| Butylenediamine-1,4 | 2 | 3 | 2 | 3 |
| 1-methylamino-3-amino-propane | 1 | 1 | 1 | 1 |
| 1,1-dimethylamino-3-amino-propane | 1 | 1 | 1 | 1 |
| Hexamethylenediamine-1,6 | 3 | 3 | 4 | 4 |
| Ammonia | 3 | 3 | 4 | 4 |
| Diethylenetriamine | 1 | 3 | 4 | 4 |
| n-Butylamine | 1 | 2 | 4 | 4 |
| Magnesium | 1 | 3 | 4 | 4 |

EXAMPLE 2

1 equivalent of a sulfonation product of α-olefins having 15 to 18 carbon atoms was reacted in aqueous solution with 1.2 equivalents of propylenediamine-1,2, 1.2 equivalents of propylenediamine-1,3, 1.2 equivalents of 1-methylamino-3-amino-propane and 1.2 equivalents of 1,1-dimethylamino-3-amino-propane, respectively and, for comparison, with 1.2 equivalents of hexamethylenediamine-1,6. For the purpose of testing the layer separation, the clear aqueous solutions produced were diluted to 2% and, in conformity with the above description, were used in comparison with salts from the above-mentioned sulfonation products and sodium, magnesium, zinc, triethylamine, n-butylamine and diethylenetriamine. The assessment of the separating effects obtained is given in the following Table II.

TABLE II

| Salt | Wetting | | Layer Separation | |
| --- | --- | --- | --- | --- |
| | NR/Reg | NBR | NR/Reg | NBR |
| Propylenediamine-1,2 | 1 | 2 | 1 | 2 |
| Propylenediamine-1,3 | 1 | 1 | 1 | 1 |
| 1-methylamino-3-amino-propane | 1 | 1 | 1 | 1 |
| 1,1-dimethylamino-3-amino-propane | 1 | 2 | 1 | 1 |
| Hexamethylenediamine-1,6 | 2 | 3 | 2 | 2 |
| Triethylamine | 2 | 2 | 4 | 3 |
| n-Butylamine | 2 | 3 | 4 | 2 |
| Diethylenetriamine | 1 | 2 | 4 | 4 |
| Magnesium | 1 | 3 | 2 | 2 |
| Zinc | 1 | 2 | 4 | 4 |
| Sodium | 2 | 3 | 3 | 3 |

EXAMPLE 3

The following solutions were used in this Example for testing the layer separation:

A. 2% clear, aqueous solution of magnesium $C_{12-14}$-fatty alcohol sulfate

B. 2% clear, aqueous solution of magnesium $C_{12-14}$-fatty alcohol-2 EO-sulfate C. 2% clear, aqueous solution of the salt of $C_{12-14}$-fatty alcohol-2 EO-sulfuric acid half-ester with propylenediamine-1,3

D. 2% solution of the salt of $C_{12-14}$-fatty alcohol sulfuric acid half-ester with propylenediamine-1,3 in water-/isopropanol 1 : 1

E. 2% clear, aqueous solution of the salt of $C_{12-14}$-fatty alcohol-2-EO-sulfuric acid half-ester with 1,1-methylamino-3-amino-propane F. 2% clear, aqueous solution of the salt of $C_{12-14}$-fatty alcohol-2-EO-sulfuric acid half-ester with 1,1-dimethylamino-3-amino-propane G. 2% solution of the salt of $C_{12-14}$-fatty alcohol-sulfuric acid half-ester with 1,1-methylamino-3-amino-propane in water-isopropanol 1 : 1

H. 2% solution of the salt of $C_{12-14}$-fatty alcohol-sulfuric acid half-ester with 1,1-dimethylamino-3-amino-propane in water/isopropanol 1 : 1.

The results of this test on layer separation is shown in Table III.

stead of the $—SO_3^-$ or $—OSO_3^-$ group. The result of the layer separation clearly shows that the products are unsuitable for this purpose. The comparison products were produced by reacting equivalent quantities of propylenediamine-1,3 or 1-methylamino-3-amino-propane with caprylic acid, lauric acid, and capric acid in aqueous solution and were tested in the form of a 2% aqueous solution. The result of the test is shown in the following Table V, as compared with the propylenediamine-1,3 or 1-methylamino-3-amino-propane salt of a sulfonated α-olefin having 15 to 18 carbon atoms (Example 2).

TABLE V

| | Wetting | | Layer separation | |
|---|---|---|---|---|
| Salt of propylenediamine-1,3 | NR/Reg | NBR | NR/Reg | NBR |
| Caprylic acid | 2 | 3 | 4 | 4 |
| Lauric acid | 1 | 1 | 4 | 4 |
| Capric acid | 1 | 1 | 4 | 4 |
| Comparison of the Invention | 1 | 1 | 1 | 1 |
| Salt of 1-methylamino-3-amino-propane | | | | |
| Caprylic acid | 2 | 3 | 4 | 4 |
| Lauric acid | 1 | 1 | 4 | 4 |
| Capric acid | 1 | 1 | 4 | 4 |
| Comparison of the Invention | 1 | 1 | 1 | 1 |

TABLE III

| | Wetting | | Layer separation | |
|---|---|---|---|---|
| Salt | NR/Reg | NBR | NR/Reg | NBR |
| A | 1 | 1 | 3 | 3 |
| B | 1 | 1 | 2 | 2 |
| C | 1 | 1 | 1 | 1 |
| D | 1 | 1 | 2 | 1 |
| E | 1 | 1 | 1 | 1 |
| F | 1 | 1 | 1 | 1 |
| G | 1 | 1 | 1 | 1 |
| H | 1 | 1 | 1 | 1 |

EXAMPLE 4

1 equivalent of commercial p-dodecyl-benzenesulfonic acid was reacted with 1.1 equivalents of ethylenediamine, 1.1 equivalents of propylenediamine-1,3, 1.1 equivalents of 1-methylamino-3-propane, 1.1 equivalents of 1,1-dimethylamino-3-amino-propane and, on the other hand, with 1.1 equivalents of magnesium hydroxide, zinc hydroxide and aluminum hydroxide respectively. For the purpose of testing the layer separation, 2% solutions were produced in a mixture of equal parts by volume of isopropanol and water. The results of the test are given in the following Table IV.

TABLE IV

| | Wetting | | Layer separation | |
|---|---|---|---|---|
| Salt | NR/Reg | NBR | NR/Reg | NBR |
| Ethylenediamine | 1 | 1 | 2 | 3 |
| Propylenediamine-1,3 | 1 | 1 | 2 | 2 |
| 1-methylamino-3-amino-propane | 1 | 1 | 2 | 2 |
| 1,1-dimethylamino-3-amino-propane | 1 | 1 | 2 | 2 |
| Magnesium | 1 | 1 | 3 | 4 |
| Zinc | 1 | 1 | 3 | 3 |
| Aluminum | 1 | 1 | 3 | 4 |

EXAMPLE 5

This test serves the purpose of comparison with other diamine salts, not pertaining to the present invention, whose anion component carries a $—COO^-$ group in-

EXAMPLE 6

The following tests are intended to show that the diamine salts in accordance with the invention can also be used to good effect as mold separating agents. A casting polyurethane of the following composition was produced for the test:

Soft polyester polyurethane 100 gm of linear polyester (commercial product Desmophen 2000 of Farbenfabriken Bayer AG)

18 gm of naphthylene-1,5-diisocyanate (commercial product Desmodur 15 of Farbenfabriken Bayer AG)

2.3 gm of a mixture of 80% cross-linker B and 20% cross-linker TR (commercial products of Farbenfabriken Bayer AG).

A mixture was prepared at increased temperature from the above-mentioned raw materials in accordance with the mixture ratios given and in accordance with the instructions given by the suppliers and was poured into steel molds which had previously been intensively cleaned and then coated twice with the solutions given in the following Table VI. The molds were pre-heated to 100°C to 110°C before they were filled. The temperature in the polyurethane mass was approximately 130°C at the time at which the molds were filled. The polyurethane mass was hardened for 3 hours at 110°C. The polyurethane mass was subsequently removed from the molds and the force required was ascertained subjectively. The results of the tests are given in the following Table VI where the rating 1 = easy, complete separation and rating 2 = difficult, complete separation.

The products given in the following Table VI were used as separating agents in the form of an 0.5% aqueous solution, and the assessment was as follows:

TABLE VI

| Salts | Mold Separation |
|---|---|
| Propylenediamine-1,3 salt of α-sulfo hydrogenated palm kernel fatty acid methyl ester | 1 |
| Butylenediamine-1,4 salt of α-sulfo hydrogenated palm kernel fatty acid methyl ester | 2 |
| Propylenediamine-1,3 salt of α-$C_{15-18}$-olefin sulfonic acid | 2 |
| Butylenediamine-1,4 salt of α-$C_{15-18}$-olefin sulfonic acid | 2 |
| 1-methylamino-3-aminopropane salt of α-sulfo-hydrogenated palm kernel fatty acid methyl ester | 1 |
| 1-dimethylamino-3-aminopropane salt of α-sulfo hydrogenated palm kernel fatty acid methylester | 1 |
| 1-methylamino-3-aminopropane salt of a $C_{12-14}$-fatty alcohol sulfuric acid half-ester | 2 |
| 1-dimethylamino-3-aminopropane salt of a $C_{12-14}$-fatty alcohol sulfuric acid half-ester | 2 |
| 1-methylamino-3-aminopropane salt of a $C_{12-14}$-fatty alcohol-2-EO-sulfuric acid half-ester | 2 |
| 1-dimethylamino-3-aminopropane salt of a $C_{12-14}$-fatty alcohol-2-EO-sulfuric acid half-ester | 2 |
| 1-methylamino-3-aminopropane salt of a α-$C_{15-18}$-olefin sulfonic acid | 1 |
| 1-dimethylamino-3-aminopropane salt of a α-$C_{15-18}$-olefin sulfonic acid | 2 |

The preceding specific embodiments are illustrative of the practice of the invention. It is to be understood, however, that other expedients known to those skilled in the art may be employed without departing from the spirit of the invention or the scope of the appended claims.

We claim:

1. In the process of separating sheets of unvulcanized rubber compositions and facilitating the removal of molded vulcanized rubber compositions from a mold comprising applying a thin film of a parting agent to the surfaces of sheets of unvulcanized rubber compositions or the surface of a mold or both and separating said sheets of unvulcanized rubber compositions without self-adhering or separating molded vulcanized rubber compositions from said mold, the improvement consisting of applying a thin film of from 25mg to 5.0gm per square meter utilizing, as said parting agent, a salt of a diamine having the formula $$R_2-\underset{\underset{R_1}{|}}{N}-R_3-NH_2$$

wherein $R_3$ is alkylene having 2 to 4 carbon atoms and $R_1$ and $R_2$ are members selected from the group consisting of hydrogen, alkyl having 1 to 8 carbon atoms and one hydrogen and one alkyl having 1 to 8 carbon atoms, with an anion component having the formula $$R - X^-$$

where $X^-$ is an anion selected from the group consisting of $-SO_3^-$ and $-OSO_3^-$ and R is selected from the group consisting of monoalkylsulfates having from 6 to 26 carbon atoms, monoalkenylsulfates having from 6 to 26 carbon atoms, monoalkadienylsulfates having from 6 to 26 carbon atoms, sulfuric acid half esters of fatty alcohol ethoxylates having 1 to 20 mols of ethylene oxide adducted to 1 mol of a fatty alcohol having 6 to 26 carbon atoms, alkylbenzensulfonates having 4 to 12 carbon atoms in the alkyl, olefinsulfonic acids having 6 to 26 carbon atoms and α-sulfo fatty acid esters with alkanols having 1 to 4 carbon atoms, where the fatty acids have from 6 to 22 carbon atoms, dissolved in an aqueous solution in a concentration of 0.1% to 10% by weight.

2. The process of claim 1 wherein $R_1$ and $R_2$ are hydrogen or methyl and $R_3$ is propylene.

3. The process of claim 2 where $R_1$ and $R_2$ are hydrogen.

* * * * *